United States Patent
Junck et al.

(10) Patent No.: US 10,430,057 B2
(45) Date of Patent: Oct. 1, 2019

(54) OPERATOR INTERFACE FOR WIRELESS SENSING AND SYSTEM AND METHOD THEREOF

(71) Applicant: Caterpillar Inc., Peoria, IL (US)

(72) Inventors: Christopher A. Junck, Washington, IL (US); Timothy A. McKinley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 318 days.

(21) Appl. No.: 15/375,852

(22) Filed: Dec. 12, 2016

(65) Prior Publication Data

US 2018/0164994 A1    Jun. 14, 2018

(51) Int. Cl.
| | | |
|---|---|---|
| *G06F 3/0484* | (2013.01) | |
| *G06F 3/0482* | (2013.01) | |
| *G06F 3/0486* | (2013.01) | |
| *G06F 3/0488* | (2013.01) | |
| *G05B 19/048* | (2006.01) | |

(52) U.S. Cl.
CPC ........ *G06F 3/04847* (2013.01); *G06F 3/0482* (2013.01); *G06F 3/0486* (2013.01); *G06F 3/0488* (2013.01); *G05B 19/048* (2013.01)

(58) Field of Classification Search
CPC .. G06F 3/04847; G06F 3/0482; G06F 3/0486; G06F 3/0488; G05B 19/048; G05D 1/0027; G06Q 50/02; G06Q 50/04; G06Q 50/06; G06Q 50/08
See application file for complete search history.

(56) References Cited

U.S. PATENT DOCUMENTS

| | | | |
|---|---|---|---|
| 9,534,930 B1 * | 1/2017 | Stamatakis | H04W 4/70 |
| 2008/0270074 A1 * | 10/2008 | Horkavi | G07C 5/008 702/182 |
| 2009/0065578 A1 * | 3/2009 | Peterson | G05B 19/048 235/382 |
| 2010/0145479 A1 * | 6/2010 | Griffiths | G01D 21/00 700/17 |
| 2012/0194336 A1 * | 8/2012 | Thiruvengada | G08B 13/19645 340/525 |
| 2014/0283144 A1 * | 9/2014 | Gettings | G08B 23/00 726/30 |
| 2015/0026622 A1 * | 1/2015 | Roaldson | G06F 3/0484 715/771 |

(Continued)

*Primary Examiner* — David S Posigian
(74) *Attorney, Agent, or Firm* — Oblon, McClelland, Maier & Neustadt

(57) ABSTRACT

An apparatus to wirelessly monitor selected sensors of a machine having a plurality of sensors includes a touchscreen display configured to display a graphical user interface (GUI) and a processor or processing circuitry that receives and analyzes data wirelessly transmitted from the selected sensors. Selection of the sensors can include display on the GUI of a first user input to receive a selection to select the machine from a predetermined list of machines, a second user input to receive an input to identify and monitor one or more operating characteristics of the machine, and a third user input to receive one or more inputs to individually associate sensor identifiers with graphics corresponding to the candidate sensor selection locations to select the sensors from which to receive and analyze data to monitor the one or more operating characteristics of the machine.

8 Claims, 4 Drawing Sheets

(56) References Cited

U.S. PATENT DOCUMENTS

2015/0169190 A1* 6/2015 Girardeau ........... G06F 3/04842
                                                            715/771
2016/0169949 A1* 6/2016 Hatchett ............. G06F 3/04817
                                                             702/62

* cited by examiner

OPERATOR INTERFACE FOR WIRELESS SENSING AND SYSTEM AND METHOD THEREOF

TECHNICAL FIELD

The present disclosure relates to an operator interface, and more particularly to an operator interface for wireless sensing of operating characteristics of a machine, and a system and a method thereof.

BACKGROUND

Machines, such as power shovels and trucks, typically include multiple sensors associated with various machine components, such as, an engine, an implement system, a transmission system, or a brake system. Generally, wireless machine data sensing systems can be implemented to collect data/signals from the sensors, and to display corresponding operational parameters of the machine via an operator interface. Conventional wireless machine data sensing systems may include disjointed technologies and components for wireless sensor setup, data measurement, data analysis and display. For example, a wireless machine data sensing system may include a wireless sensor data aggregator in the machine and a data collection center located at a back office. Such interaction of disjointed components of the wireless machine data sensing systems may result in processing delays because of handshaking requirements and cellular latency.

SUMMARY OF THE DISCLOSURE

In one aspect of the present disclosure, a self-contained apparatus to wirelessly monitor selected sensors of a machine having a plurality of sensors is provided. The self-contained apparatus includes a housing and receiver circuitry. The receiver circuitry includes an antenna. The receiver circuitry is provided at least partially in the housing and is configured to wirelessly receive signals from the selected sensors of the plurality of sensors of the machine. The selected sensors are less than a total number of sensors of the plurality of sensors. The self-contained apparatus includes wireless sensor interface circuitry provided in the housing, and the wireless sensor interface circuitry is electrically coupled to the receiver circuitry. The wireless sensor interface circuitry is configured to receive and aggregate sensor data from the receiver circuitry corresponding to the sensor signals from the selected sensors. The self-contained apparatus also includes processing circuitry electrically coupled to the wireless sensor interface circuitry. The processing circuitry is configured to analyze the sensor data from the wireless sensor interface circuitry. The self-contained apparatus further includes a touchscreen display physically coupled to the housing and electrically coupled to the processing circuitry. The touchscreen display is configured to display a graphical user interface generated using the processing circuitry. The touchscreen display shows real-time information corresponding to one or more operating characteristics of the machine associated with the selected sensors based on the sensor data analyzed by the processing circuitry. The self-contained apparatus further includes a power supply provided in the housing. The power supply is electrically coupled to the touchscreen display, the wireless sensor interface circuitry, the receiver circuitry and the processing circuitry, to provide power to the touchscreen display, the wireless sensor interface circuitry, the receiver circuitry, and the processing circuitry, respectively. The processing circuitry is configured to cause the graphical user interface to provide a first user input, a graphic of the machine, a second user input, graphics corresponding to candidate sensor selection locations, and a third user input. The first user input is provided to select the machine from a predetermined list of machines. The graphic of the machine is provided in response to the first user input. The second user input is provided to identify one or more operating characteristics of the machine to be monitored. The graphics corresponding to candidate sensor selection locations on the machine are provided in response to the second user input. The graphics corresponding to candidate sensor selection locations are associated with the one or more operating characteristics of the machine to monitor. The third user input is provided to individually associate sensor identifiers with the graphics corresponding to the candidate sensor selection locations and to identify the selected sensors to be wirelessly monitored. The processing circuitry is also configured to cause the graphical user interface to provide the real-time information corresponding to the operating characteristics of the machine associated with the selected sensors, in response to the third user input.

In another aspect of the present disclosure, an apparatus to wirelessly monitor selected sensors of a machine having a plurality of sensors is provided. The apparatus includes a touchscreen display configured to display a graphical user interface. The apparatus further includes circuitry configured to receive data wirelessly transmitted from the selected sensors of the plurality of sensors of the machine and analyze the data received from the selected sensors. The circuitry is further configured to control display on the graphical user interface of a first user input to select the machine from a predetermined list of machines and control display on the graphical user interface of a graphic of the machine in response to the first user input. The circuitry is also configured to control display on the graphical user interface of a second user input to identify one or more operating characteristics of the machine to monitor, and control display on the graphical user interface of graphics corresponding to candidate sensor selection locations on the machine associated with the one or more operating characteristics of the machine to monitor, in response to the second user input. The circuitry is also configured to control display on the graphical user interface of a third user input. The third user input individually associates sensor identifiers with the graphics corresponding to the candidate sensor selection locations to identify the selected sensors to be monitored. The circuitry is also configured to control display on the graphical user interface of information corresponding to the one or more operating characteristics of the machine. The display on the graphical user interface of information is controlled based on the analyzed data received from the selected sensors, in response to the third user input. The one or more operating characteristics are associated with the selected sensors.

In yet another aspect of the present disclosure, a method of selectively monitoring an operator-selected set of sensors of a machine is provided. The method includes controlling display of, on a graphical user interface, a first user input, a graphic of the machine, a second user input, graphics corresponding to the predetermined candidate sensor selection locations, and a third user input. The first user input is provided to select the machine from a predetermined list of machines. The graphic of the machine is displayed in response to operator input using the first user input. The second user input is provided to identify operating characteristics of the machine to be monitored. The graphics corresponding to the predetermined candidate sensor selection locations on the machine are displayed in response to the second user input. The predetermined candidate sensor selection locations are associated with the operating characteristics of the machine to be monitored. The third user input individually associates sensor identifiers with the graphics corresponding to the predetermined candidate sensor selection locations. The method also includes controlling display of, on the graphical user interface, information corresponding to the operating characteristics of the machine associated with the operator-selected set of sensors based on data received from the operator-selected set of sensors, in response to the operator input using the third user input.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
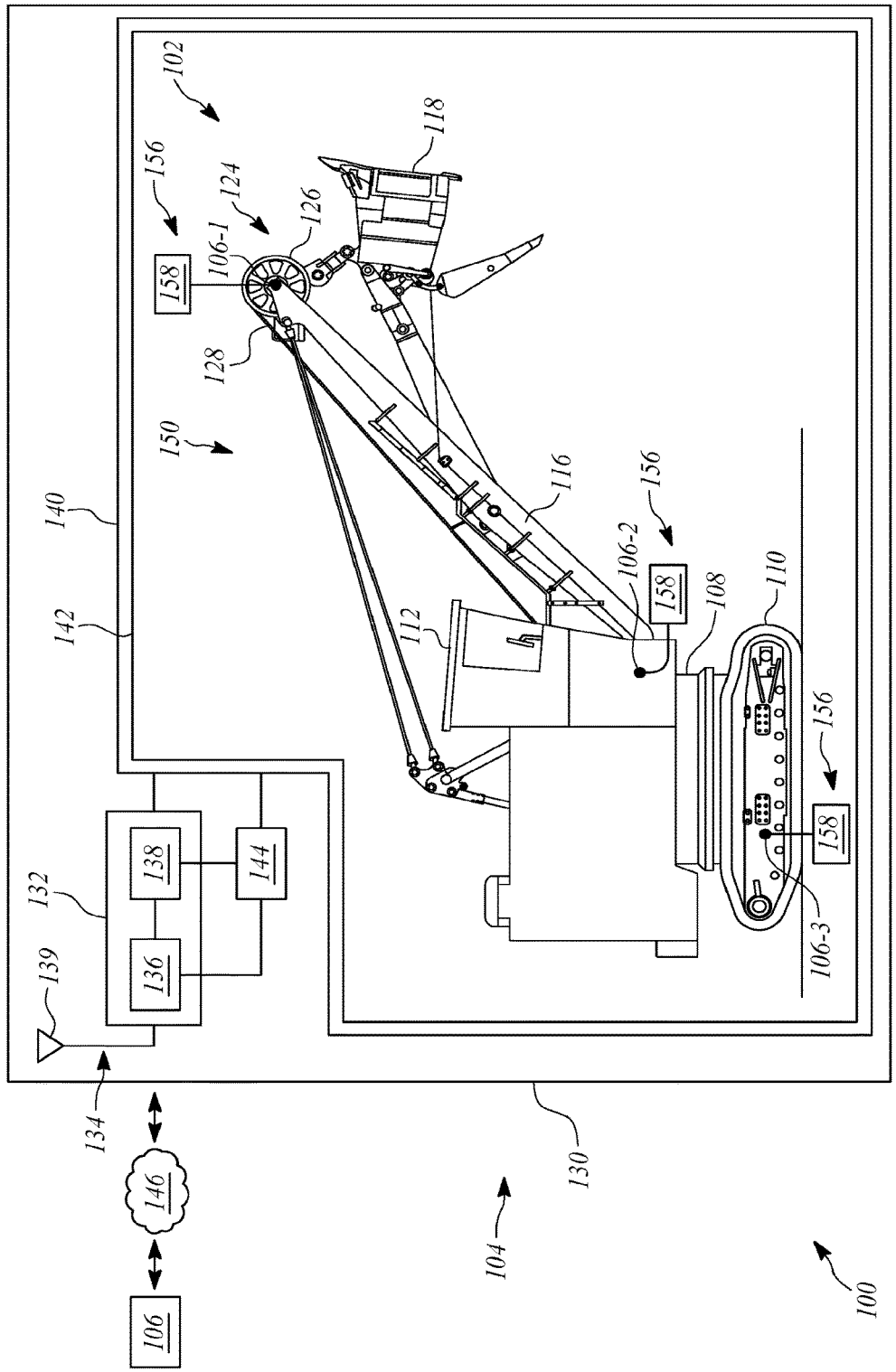
FIG. 1 is a block diagram of a system to wirelessly monitor selected sensors of a machine, according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter relate to a wireless machine data sensing and collection system that can implement a single device or apparatus to setup and perform wireless receipt of signals from select sensors, sensor data aggregation, sensor data analysis, and display of visual feedback corresponding to sensed operating characteristics of a selected machine. The apparatus of the wireless machine data sensing and collection system can be or include a self-contained apparatus. Further, the apparatus can implement standardized templates to show sensor configurations and locations of the sensors specific to each machine of one or more machines. A user interface display can be provided and may include a Graphical User Interface (GUI). The GUI may be used to select a machine to monitor, select operating characteristics to monitor, and associate sensor identifiers with locations of installed sensors on a graphic of the machine displayed on the GUI as selected sensors to monitor. Based on the association of the sensor identifiers with sensors to create a "selected set of sensors," the user interface display may provide visual feedback of sensed operating characteristics of the machine at the specific locations around the machine corresponding to where the selected sensors are located.

FIG. 1 is a block diagram of a wireless machine data sensing and collection system 100, according to one or more embodiments of the present disclosure. The wireless machine data sensing and collection system 100, which may be interchangeably referred to as "system 100," can include or be an apparatus 104. Particularly, the apparatus 104 may be a self-contained apparatus, meaning that the apparatus 104 can have all the components, interfaces, programming, etc. to perform setup and operations for wireless receipt of signals from one or more selected sensors, sensor data aggregation, sensor data analysis, and display of visual feedback corresponding to sensed operating characteristics of a machine, such as machine 102. The wireless machine data sensing and collection system 100 can be configured to receive wireless signals from a plurality of sensors 106, which may constitute a set of selected sensors 106.

Generally speaking, the wireless machine data sensing and collection system 100 can provide visual feedback, for instance, real-time visual feedback, regarding one or more selected operating characteristics of the machine 102 to an operator of the wireless machine data sensing and collection system 100. Further, prior to receiving the operating characteristics of the machine 102, the wireless machine data sensing and collection system 100 can enable the operator to select a machine to monitor, the operating characteristics of the machine 102 to monitor, and/or types of sensors from which to receive signals corresponding to the operating characteristics of the machine 102. The wireless machine data sensing and collection system 100 can provide the visual feedback regarding one or more operating characteristics of the machine 102.

The wireless machine data sensing and collection system 100 can be comprised of a wireless access point 132 and an operator interface 140. Optionally, the wireless access point 132 may be provided at least partially in a housing 130, which may be a case, for instance. The operator interface 140 may be integrated in or physically coupled to the housing 130. Optionally, the wireless machine data sensing and collection system 100 may be portable, for instance, able to be hand-carried.

Generally, the wireless access point 132 may have circuitry or circuits, including receiver circuitry 134 and a wireless sensor interface 136, which may be implemented in circuitry or a processor, and a controller 138, which may be implemented in or as a processor or processing circuitry. The wireless access point 132 may perform at least one of data aggregation from sensors 106 and analysis of the aggregated data. Further, the wireless access point 132 may cause or control information corresponding to the aggregated and/or analyzed data from the sensors 106 to be output on the operator interface 140.

The wireless machine data sensing and collection system 100 can also be comprised of a power supply 144, which may be inside the housing 130, for instance, and optionally part of the wireless access point 132 in one or more embodiments of the disclosed subject matter. As an example, the power supply 144 may be a battery and/or a solar panel. Additionally or alternatively, power to the wireless machine data sensing and collection system 100 can be received via a connection from an external source, such as an electrical outlet of the machine 102 (e.g., CAN bus), another machine, or a monitoring facility (e.g., Ethernet). The power supply 144 can provide power to the wireless access point 132 and the operator interface 140.

The receiver circuitry 134 may include at least one antenna 139. Generally speaking, the receiver circuitry 134 can receive wireless signals from the sensors 160 via a wireless communication network 146. Optionally, the signals from the sensors 160 received by the receiver circuitry 134 may be data, or information in the sense that the sensors 160 may be so-called smart sensors and may have processed the raw signals to some extent prior to sending to the receiver circuitry 134. Further, the receiver circuitry 134 may be electrically coupled to the wireless sensor interface 136 via a wired communication medium, for instance.

The wireless sensor interface 136 can receive sensor data associated with the sensors 106 from the receiver circuitry 134 via a wired communication medium, for instance. Generally speaking, the wireless sensor interface 136 may aggregate the sensor data received from the receiver circuitry 134.

The controller 138 may be electrically coupled to the wireless sensor interface 136. The controller 138 may receive the aggregated sensor data from the wireless sensor interface 136. Further, the controller 138 may analyze the aggregated sensor data and generate information corresponding to one or more operating characteristics of the machine 102 associated with the sensors 106 based on the analyzed aggregated sensor data. Discussed in more detail below, the controller 138 may provide such information for output on the operator interface 140. In one or more embodiments, such information may be provided for output in real time for display in real time. Optionally, the controller 138 can be comprised of and/or coupled to memory, and can perform analysis of the aggregated sensor data in real time, for instance. The results of such sensor data analysis can be provided by the controller 138 for output on the operator interface 140.

The operator interface 140 can be comprised of a touchscreen display, which may be configured to display a graphical user interface (GUI) 142. Incidentally, FIG. 1 may be representative of a portion of the GUI 142, for example, one screen or graphic of a plurality of screens or graphics of the GUI 142. As noted above, the operator interface 140, or portion thereof, such as the touchscreen display, can be integrated in or physically coupled to the housing 130. Further, the operator interface 140 may be electrically coupled to the controller 138 of the wireless access point 132. The touchscreen display may be a display device including, but not limited to, an LCD display or a plasma display. In one example, the wireless machine data sensing and collection system 100 may include the operator interface 140 in the form of a first touch screen display located at an extraction site (not shown) and a second touch screen display (not shown) located at a disposal site (not shown). The first and second touchscreen displays may display information, such as real time information, pertaining to selected sensed operating characteristics of a machine, such as a dump truck, as the machine moves between the extraction site and the disposal site.

Still referring to FIG. 1, but discussed in more detail below, the graphical user interface (GUI) 142 may provide a user input to select the machine 102 from among a plurality of machines from a predetermined list of machines of the same type of machine and/or different types of machines. Thus, FIG. 1 illustrates a graphic 150, on the GUI 142, of the selected machine 102, which has been selected using the GUI 142.

As illustrated in FIG. 1, the machine 102 can be a shovel or a dragline excavator, for instance. The machine 102 includes various components, such as a frame 108, ground engaging members 110 coupled to the frame 108, an operator cabin 112, a boom 116 extending from and coupled to the frame 108, a bucket 118, and a hoist mechanism 124 provided at an end of the boom 116. The hoist mechanism 124 can include a winch (not shown), a pulley 126, and hoist cables 128, among other components.

The machine 102 can be equipped with the sensors 106 at various components of the machine 102, such as the ground engaging members 110, the frame 108, an engine, a transmission system, a braking system, the hoist mechanism 124, etc., to sense or detect one or more operating characteristics of the machine 102. The operating characteristics of the machine 102 may include, but are not limited to, speed, steering angle, geographical location, load, load distribution, temperature, etc. The operating characteristics of the machine 102 may also include orientation, such as pitch, and stress and/or strain on various components of the machines 102, such as the ground engaging members 110, the frame 108, the engine, the transmission system, and the braking system. Thus, the sensors 106 may include, but are not limited to, an accelerometer, a temperature sensor, a Global Position System (GPS) sensor, a pressure sensor, a torque sensor, a stress or strain sensor, and/or a tire-pressure monitoring sensor.

In FIG. 1, the machine 102 is illustrated with three sensors 106-1, 106-2, and 106-3, which may be referred to herein as a first sensor 106-1, a second sensor 106-2, and a third sensor 106-3. However, the machine 102 may include fewer or more than three sensors 106. In one example, the first sensor 106-1 may detect operating characteristics, such as, but not limited to, a load carried by the hoist mechanism 124 and temperature associated with the pulley 126, such as pin temperature. The second sensor 106-2 may be associated with the ground engaging members 110 of the machine 102, and, as such, may detect operating characteristics of the ground engaging members 110, including, but not limited to, ground speed of the machine 102. The third sensor 106-3 may be associated with the frame 108 of the machine 102, and may detect operating characteristics including, but not limited to, the geographical location of the machine 102.

The sensors 106 can generate signals corresponding to sensed or measured operating characteristics of the machine 102. The signals generated by the sensors 106 may be either analog signals or digital signals. The signals generated by the sensors 106 may be hereinafter referred to as either "sensor data" or "data." The sensors 106 may wirelessly communicate with the wireless machine data sensing and collection system 100, particularly with the apparatus 104 via the wireless communication network 146. In one embodiment, the sensors 106 can wirelessly transmit sensor data to the apparatus 104 at a programmed transmission rate. In one example, the programmed transmission rate may range from 1 Hz to 1 KHz per hour. Additionally or alternatively, each sensor 106 can transmit sensor data to the apparatus 104, for instance, in response to a detected operating characteristics condition of the machine 102, such as the operating characteristic reaching or exceeding a predetermined threshold value.

In some embodiments, the wireless machine data sensing and collection system 100 may be implemented in a worksite having multiple machines. In such a scenario, the sensors 106 of each selected machine may transmit data over the wireless communication network 146, for instance, from a distance of up to 2 kilometers. For example, a mining operation may involve a large mining machine and a service truck operating at the worksite. Select operating characteristics of the large mining machine and the service truck may be communicated to the apparatus 104, which may be located in the large mining machine, in the service truck, or outside both machines but within a transmit/receive distance from both machines.

As noted above, the operator interface 140, which can be or include a touchscreen display, may display a graphical user interface (GUI) 142 generated using the controller 138, for instance. The GUI 142 may be configured to receive a set of operator inputs to set up the wireless machine data sensing and collection system 100 to monitor select operating characteristics of the machine 102. Further, the GUI 142 may display information, for instance, real-time information, pertaining to the selected operating characteristics of the machine 102 based on the set or sets of operator inputs.

Figure 2:
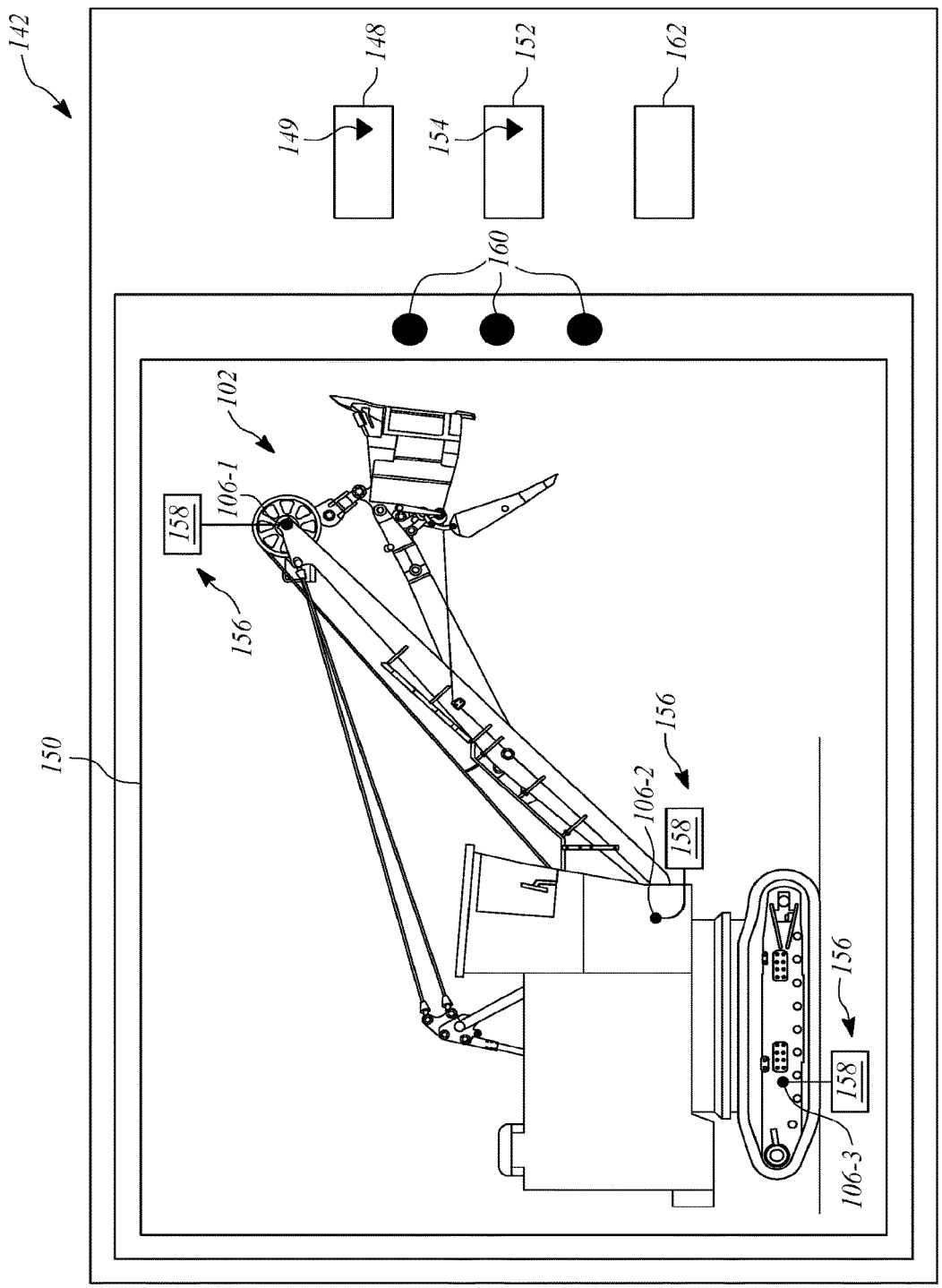
FIG. 2 is a diagrammatic representation of a Graphical User Interface (GUI) according to one or more embodiments of the present disclosure.

FIG. 2 is a diagrammatic representation of the graphical user interface (GUI) 142 according to one or more embodiments of the present disclosure. Discussed in more detail below, the GUI 142 can be controlled, by the controller 138, for instance, to display a first user input 148, a second user input 152, a third user input 160, and one or more graphics, such as graphic 150, graphics 156, and graphic 162. Such inputs and one or more graphics can be displayed all at the same time, or two or more at the same time, for instance.

The first user input 148 can be provided on the GUI 142 to select the machine 102 from a predetermined list of machines. The predetermined list of machines may be preconfigured or stored in the controller 138 or associated memory. Optionally, the predetermined list of machines may be created by the controller 138 prior to the operator activating the first user input 148, for instance, based on detection of the machines in a transmitting/receiving range of the wireless machine data sensing and collection system 100. Further, the predetermined list of machines may include different types of machines, or different machines of the same type, each having sensors 106 configured to sense operating characteristics of the associated machine and to wirelessly transmit data to the wireless machine data sensing and collection system 100.

In one embodiment, the first user input 148 may be provided as a drop down menu 149 having the predetermined list of machines. In another embodiment, the first user input 148 may allow the user to enter machine-specific information, such as a machine model of the machine, for which operating characteristics are to be monitored. The machine model may be an identification entity for the machine 102. The controller 138 may cause the GUI 142 to identify the machine 102 for which operating characteristics are to be monitored based on the entered machine model. Further, if multiple machines of the same model are available, the first user input 148 may provide for a further input to select a particular machine or machines having the entered model. The controller 138, for instance, can cause the GUI 142 to display a graphic 150 of the machine 102 in response to selection of the machine 102 via the first user input 148. The graphic 150 of the machine 102 may, in one or more embodiments of the disclosed subject matter, take the form of a diagrammatic representation of the machine 102, such as illustrated in FIG. 2. In the illustrated embodiment, the machine 102 selected using the first user input 148 is a shovel machine. Of course, other machines may be selected using the first user input 148. In one or more embodiments, the graphic 150 of the machine 102 can show or include locations 158 of the sensors 106 associated with various components of the machine 102.

The controller 138, for instance, can cause the GUI 142 to provide a second user input 152. The second user input 152 can be to select operating characteristics of the machine 102 to be monitored. In one example, the second user input 152 may be provided as a drop down menu 154. In one example, the drop down menu 154 may include a predetermined list of operating characteristics of the machine 102 to monitor. Further, the controller 138 can identify one or more sensors of the sensors 106 associated with the selected operating characteristics and corresponding locations of the identified sensors 106 in the machine 102.

Referring to FIG. 2, for instance, the controller 138 can cause the GUI 142 to show graphics 156 corresponding to sensor locations 158 on the machine 102, in response to the second user input 152. The sensor locations 158 may be hereinafter interchangeably referred to as one of "candidate sensor selection locations 158" or "predetermined candidate sensor selection locations 158." The sensor locations for selection may be predetermined in the sense that they may be based on a standardized template for the selected machine 102 and/or the selected operating characteristics of the machine 102 to monitor. In some embodiments, the graphics 156 may also provide information including, but not limited to, the type of each of the sensors 106 for sensing the selected operating characteristics. In one embodiment, the sensors 106 may be color coded based on the operating parameter sensed by the sensors 106. The color code may be predefined by the manufacturer of the wireless machine data sensing and collection system 100.

Still referring to FIG. 2, the controller 138 can cause the GUI 142 to provide a third user input 160 to individually associate sensor identifiers with respective sensors 106 of the graphics 156 corresponding to the sensor locations 158. The sensors 106 may be identified by the sensor identifiers, such as specific payloads, sensor timelines and associated serial numbers. In one example, the sensor identifiers may indicate an identification entity for the sensors 106. The sensor identifiers may include at least one of character, letter, numeral, and combination of all. In one example, the sensor identifiers may be predefined by a manufacturer of the sensors 106. In one or more embodiments of the disclosed subject matter, the third user input 160 may be a "drag and drop" option to select sensors 106. For example, the third user input 160 may be or include dragging and dropping the sensor identifiers to the respective sensors 106 of the graphics 156 corresponding to the sensor locations 158. In one example, the sensor locations 158 may be interchangeable. In another example, similar sensors may be implemented at various locations. However, the location of the sensor 106 may be determined based on the sensor identifiers.

The sensors 106 may be selected based on the third user input 160. The sensors 106 selected using the third user input 160 may be referred to herein as "selected sensors." Further, the selected sensors may be hereinafter interchangeably referred to as "the operator-selected set of sensors." The third user input 160 may identify selected sensors to be wirelessly monitored. The selected sensors may be powered up and selected (e.g., "popped in") as usable sensors for monitoring operating characteristics of the machine 102. Such selection of sensors may initiate wireless communication with the receiver circuitry 134 of the apparatus 104, for instance.

It may be noted that the number of selected sensors may be less than a total number of sensors 106 equipped in the machine 102. The operator may identify and select each of the sensors 106 using the corresponding sensor identifiers of the sensors 106. In one embodiment, the selected sensors may be viewed as a part of the wireless machine data sensing and collection system 100. In another embodiment, all the sensors 106 equipped in the machine 102 may be a part of the of the wireless machine data sensing and collection system 100.

The apparatus 104 can wirelessly monitor the selected sensors of the machine 102. The selected sensors may transmit corresponding sensor data regarding operating characteristics of the machine 102 to the wireless machine data sensing and collection system 100, particularly the apparatus 104. The wireless sensor interface 136 can aggregate the sensor data received via the receiver circuitry 134. The processing circuitry 138 can analyze the aggregated sensor data and cause the GUI 142 to display information corresponding to the operating characteristics of the machine 102 associated with the selected sensors, in response to the third user input 160. In one embodiment, the information may be displayed as a graphic 162. In another embodiment, the information may be displayed in tabular format.

Figure 3:
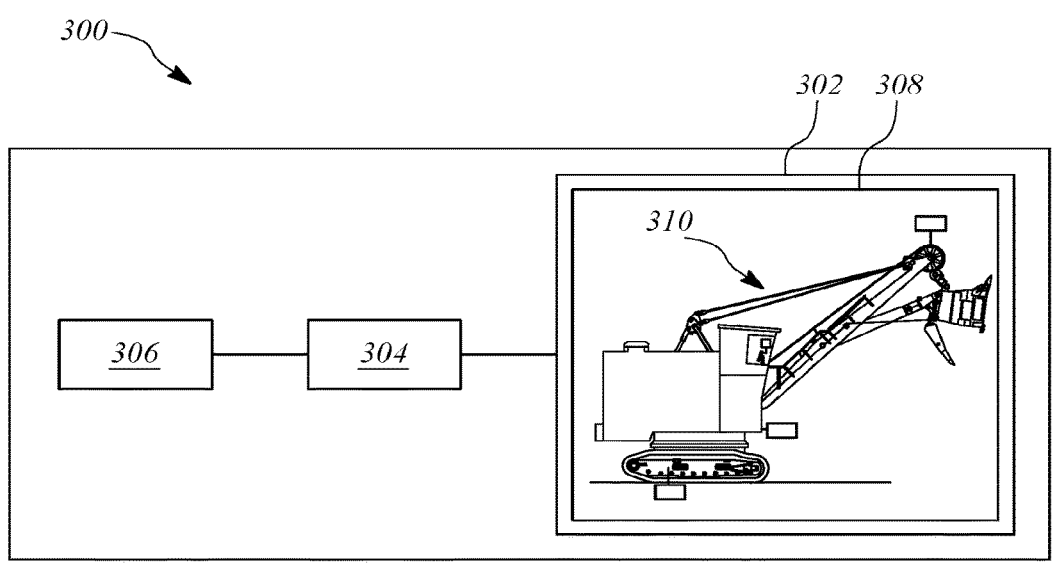
FIG. 3 is a block diagram of an apparatus to wirelessly monitor selected sensors of a machine, according to one or more embodiments of the present disclosure.

FIG. 3 is a schematic block diagram of an apparatus 300 to wirelessly monitor selected sensors (not shown) of a machine, such as the machine 102. The apparatus 300 can be wirelessly connected to the sensors (not shown) via a wireless communication network, such as the wireless communication network 146. The apparatus 300 can include a touchscreen display 302 and circuity 304. The apparatus 300 may optionally include memory 306 in communication with the circuitry 304. The touchscreen display 302 may be a display device including, but not limited to, an LCD display device, and a plasma display device. The touchscreen display 302 may display a GUI 308, such as the GUI 142 of FIG. 1 or of FIG. 2.

The circuitry 304 can be electrically coupled to the touchscreen display 302. The circuitry 304 can control the GUI 308 to receive a set of operator inputs related to selection of a machine, such as the machine 102, and the monitoring of select operating characteristics of the machine 102. The circuitry 304 may control the GUI 308 to display the information pertaining to the selected operating characteristics of the machine 102. Optionally, the information may be displayed in real-time.

The circuitry 304 of the apparatus 300 can receive data wirelessly transmitted from sensors of the machine 102 selected using the GUI 308. The circuitry 304 can analyze the data received from the selected sensors to render corresponding information on the GUI 308 of the touchscreen display 302.

The memory 306 may be electrically connected to the circuitry 304. The memory 306 may store data including the predetermined list of machines available to select for monitoring of select operating characteristics of the selected machine. The memory 306 may also store data including, but not limited to, the sensed operating characteristics of the machine 102, the sensors 106 equipped in each machine in the predetermined list of machines, and sensor selection location templates, for instance. The sensor selection location templates may identify all sensor selection locations for each machine in the predetermined list of machines. The circuitry 304 may fetch data stored in the memory 306 upon receipt of a set or sets of operator inputs, and control the GUI 308 based on the set or sets of operator inputs. The set or sets of operator input can include the first user input 148, the second user input 152, and the third user input 160, as illustrated diagrammatically in the GUI 142 of FIG. 2, for instance. The circuitry 304 may control the GUI 308 based on the first user input 148, the second user input 152, and the third user input 160.

Referring to FIG. 2 and FIG. 3, the circuitry 304 may control display on the GUI 308 of the first user input 148 to select the machine 102 from the predetermined list of machines. Further, in response to the first user input 148, the circuitry 304 may identify the machine 102 and fetch a graphic 310, such as the graphic 310 of the machine 102 from the predetermined list of machines stored in the memory 306. The circuitry 304 may further control display on the GUI 308 of the graphic 310 of the machine 102 corresponding to the first user input 148. The circuitry 304 may further control display on the GUI 308 of the second user input 152. The circuitry 304 may identify the operating characteristics of the machine 102 to be monitored based on the second user input 152 from the operating characteristics corresponding to the machine 102 stored in the memory 306. Further, the circuitry 304 may map the operating characteristics selected using the second user input 152 with the sensors 106 of the machine 102 and the corresponding locations of the sensors 106. Based on the mapping, the circuitry 304 may identify candidate sensor selection locations, such as sensor locations 158 on the machine 102 associated with the operating characteristics of the machine 102 to be monitored. The sensor locations 158 may be provided based on the sensor selection location templates associated with the machine 102. In response to the second user input 152, the circuitry 304 may control display on the GUI 308 of the graphics 156 corresponding to the sensor locations 158 on the machine 102 associated with the operating characteristics of the machine 102 to be monitored.

The circuitry 304 may also control display on the GUI 308 of the third user input 160 to individually associate the sensor identifiers with the graphics 156 corresponding to the sensor locations 158. The third user input 160 may identify the selected sensors to be monitored. As mentioned earlier, the third user input 160 may include dragging and dropping the sensor identifiers to the graphics 156 corresponding to the candidate sensor selection location 158.

In response to the third user input 160, the circuitry 304 may control display on the GUI 308 of information corresponding to the operating characteristics of the machine 102 associated with the selected sensors based on the analyzed data received from the selected sensors. In one embodiment, the selected sensors can be less than the total number of sensors 106 in the machine 102. In another embodiment, the selected sensors may include all sensors 106 of the machine 102. In some embodiments, the selected sensors can be the same type of sensor, to measure the same operating characteristics of the machine 102 (e.g., same type of operating characteristic, such as pin temperature, but different locations about the machine 102). The information related to the operating characteristics of the machine 102 can correspond to real-time operating characteristics of the machine 102.

INDUSTRIAL APPLICABILITY

The present disclosure relates to a wireless machine data sensing and collection system, such as wireless machine data sensing and collection system 100, and an apparatus, such as self-contained apparatus 104, to wirelessly monitor the selected sensors of the machine 102. The wireless machine data sensing and collection system 100 can be embodied as a single device for providing visual feedback in real time, for instance, regarding selected operating characteristics of the machine 102 to an operator of the wireless machine data sensing and collection system 100. The wireless machine data sensing and collection system 100 may be implemented in site management systems including, but not limited to, fleet management systems and terrain management systems. The sensors 106 used in the machine 102 may be smart sensors. Hence, a preliminary analysis of sensor data may be performed at the sensors 106.

The wireless machine data sensing and collection system 100 can receive sensor data from selected sensors of the sensors 106 disposed in the machine 102, for instance, in real time. The wireless access point 132 can cause the GUI 142 to display selected operating characteristics of the machine 102 based on the operator input. The GUI 142 of the wireless machine data sensing and collection system 100 can be user friendly and intuitive, generally speaking, which may be effortlessly operated by the operator. It may be noted that the location of the operator-selected set of sensors provided on the GUI 142 may be interchangeable. However, the real-time information corresponding to the operating characteristics displayed in the GUI 142 may be fool-proof or less likely to involve error if the operator selects correct sensor identifiers corresponding to each of the selected sensors of the sensors 106. Also, implementing the GUI 142 may replace a metadata document of the operating characteristics of the machine 102 with the real-time information corresponding to the operating characteristics in a user readable format.

The wireless machine data sensing and collection system 100 can be located onboard the machine 102, and hence any latency in displaying real-time information caused due to at least one of handshaking, cellular latency, and processing latency can be eliminated or reduced. The wireless machine data sensing and collection system 100 may provide customizable results instantaneously for all the machines in the predetermined list. Further, the real-time information may also help in determining a range of operating characteristics such as, a maximum value and a minimum value of one of stress and strain that may be applied on the components of the machine 102. The real-time information may also provide information including, but not limited to, areas to be focused on in the machine 102, machine maintenance, loading history at certain locations, etc. The real-time information may include alerts regarding locations of the machine 102 that need to be repaired. The real-time information may also include alerts regarding locations of the machine 102 that require more detailed inspection. The GUI 142 of the wireless machine data sensing and collection system 100 may alert the operator of the wireless machine data sensing and collection system 100 immediately instead of having latency and subjectivity to get the information from a back office.

The wireless machine data sensing and collection system 100 may be retrofitted in multiple machines and/or worksites. The wireless machine data sensing and collection system 100 may be customized based on the machine 102 or the worksite in which it is implemented. In addition, the wireless machine data sensing and collection system 100 may provide customizable real-time information instantaneously for all machines present in the predetermined list of machines. The wireless machine data sensing and collection system 100 may be used on a multitude of devices producing redundant information. The wireless machine data sensing and collection system 100 may be used by multiple people in different capacities.

Figure 4:
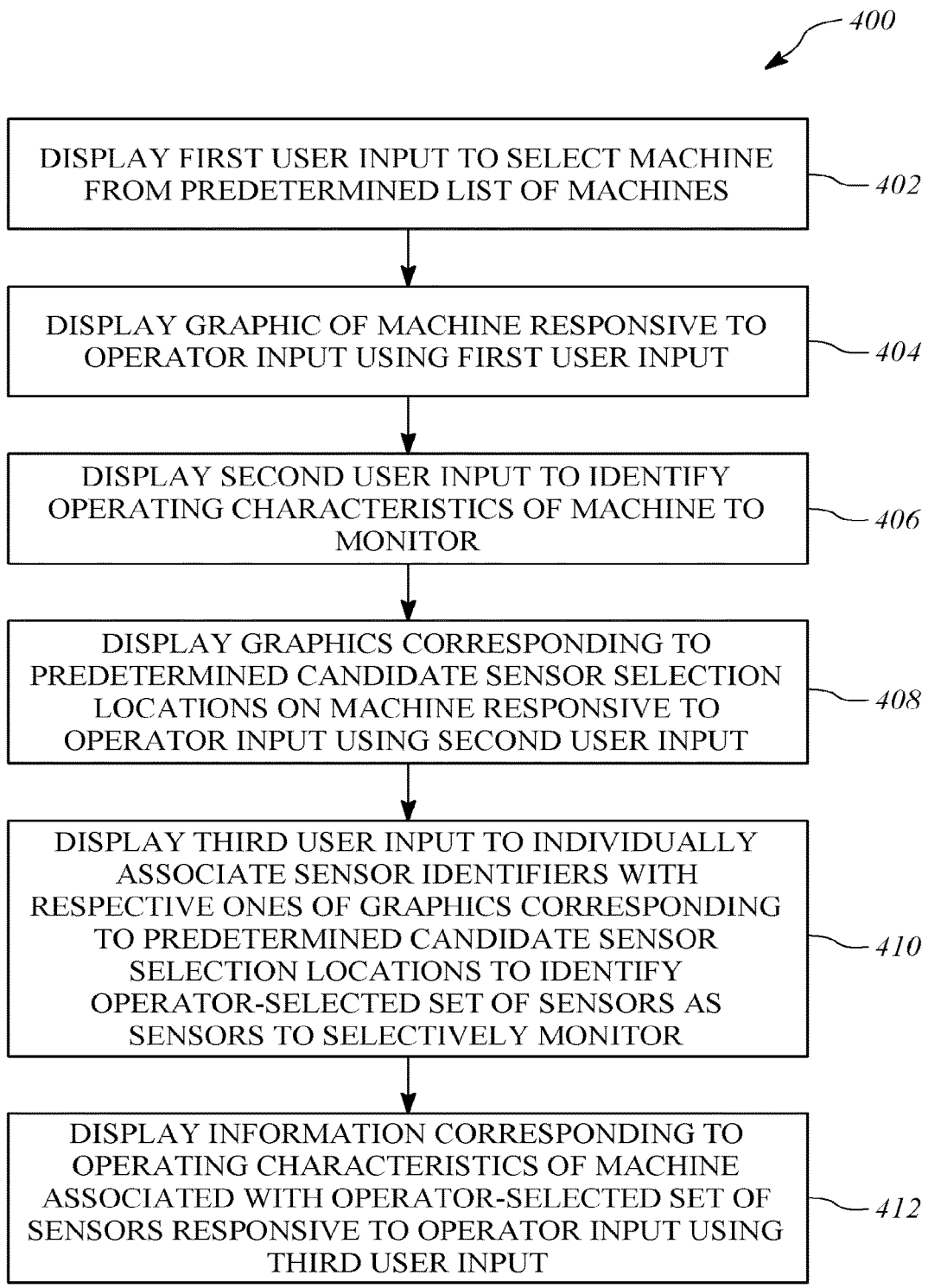
FIG. 4 is a flow chart of a method of selectively monitoring selected sensors of a machine, according to one or more embodiments of the present disclosure.

FIG. 4 illustrates a flow chart of a method 400 of selectively monitoring an operator-selected set of sensors of a machine, such as the machine 102, according to one or more embodiments of the present disclosure. In one embodiment, the method 400 of selectively monitoring the operator-selected set of sensors of the machine 102 can be performed using the wireless access point 132 of the self-contained apparatus 104. For the sake of brevity, the aspects of the present disclosure which are already explained in detail in the description of FIG. 1, FIG. 2, and FIG. 3 are not explained in detail with regard to the description of the method 400.

At block 402, the method 400 may include displaying on a GUI, such as GUI 142, a first user input, such as the first user input 148, to select the machine 102 from a predetermined list of machines on a GUI. The first user input 148 may include the drop down menu 149 indicating the predetermined list of machines. Therefore, the method 400, at block 402, can allow for selection of machine or machines to be monitored from the predetermined list of machines. The wireless access point 132 of the self-contained apparatus 104 can cause the GUI 142 to display the first user input 148. In an embodiment, the controller 138 can select the machine 102 from the predetermined list of machines based on the first user input 148.

At block 404, the method 400 may include displaying the graphic 150 of the machine 102 on the GUI 142 in response to the operator input using the first user input 148. The controller 138 can identify the machine 102 based on the first user input 148 and fetch the graphic 150 of the machine 102 from a set of graphics of the predetermined list of machines, which may be stored in memory of the controller 138 or elsewhere. The controller 138 can cause the GUI 142 to display the graphic 150 of the machine 102. The graphic 150 of the machine 102 can include components of the machine 102 including, but not limited to, the ground engaging members 110 and the frame 108. The graphic 150 may also display the sensors 106 equipped in the machine 102.

At block 406, the method 400 can include displaying on the GUI 142 a second user input, such as the second user input 152. The wireless access point 132 of the self-contained apparatus 104 can cause the GUI 142 to display the second user input 152. In an embodiment, the controller 138 can select operational characteristics of the machine 102 to monitor based on the second user input 152. Through the second user input 152, the method 400 can allow identification or selection of an operating characteristic of the machine 102 which is to be monitored. In one example, the operating characteristics of the machine 102 may be listed in the drop down menu 154. Each component of the machine 102 may have a set of operating characteristics. In another example, the operating characteristics may be classified into multiple groups based on the sensors 106 used for detecting the operating characteristics.

At block 408, the method 400 may include displaying on the GUI 142 graphics, such as the graphics 156, corresponding to the predetermined candidate sensor selection locations 158 on the machine 102. The predetermined candidate sensor selection locations 156 can be associated with the operating characteristics of the machine 102 to be monitored. The graphics 156 may be displayed in response to an operator input using the second user input 152. In one example, the graphics 156 can include the predetermined candidate sensor selection locations 158 associated with the operating characteristics selected by the operator using the second user input 152. The controller 138 can identify the sensors 106 corresponding to the operating characteristics. The controller 138 can cause the display of the predetermined candidate sensor selection locations 158 on the graphic 150 of the machine 102 displayed on the GUI 142.

At block 410, the method 400 may further include displaying a third user input, such as the third user input 160 on the GUI 142. The third user input 160 may individually associate the sensor identifiers with the graphics 156 corresponding to the predetermined candidate sensor selection locations 158 to identify the operator-selected set of sensors as sensors to be selectively monitored. The third user input 160 can include dragging and dropping the sensor identifiers to the graphics 156 corresponding to the predetermined candidate sensor selection locations 158. The predetermined candidate sensor selection locations 158 may be determined based on one of the plurality of sensor selection location templates associated with the machine 102 stored in the memory 306 of the apparatus 300. After the operator input using the third user input 160, the receiver circuitry 134 of the self-contained apparatus 104 can wirelessly receive data from the operator-selected set of sensors. The wireless access point 132 can analyze the data received from the operator-selected set of sensors.

At block 412, the method 400 may include displaying information corresponding to the operating characteristics of the machine 102 associated with the selected sensors on the GUI 142, in response to or after an operator input using the third user input 160. The information corresponding to the operating characteristics of the machine 102 can correspond to real-time operating characteristics of the machine 102. The operating characteristics can be associated with the operator-selected set of sensors, and can be generated based on the data received from the operator-selected set of sensors.

The method 400 of selectively monitoring the operator-selected set of sensors of the machine 102 may provide an intuitive process of monitoring the machine 102 or machines that may be easily performed by a consumer/operator on the machine or at any other predefined location.

The method 400 of selectively monitoring the operator-selected set of sensors of the machine 102 can eliminate or reduce delay in displaying real-time information caused due to any one of handshaking, cellular latency, and processing latency.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A self-contained apparatus comprising:
   a housing;
   receiver circuitry including an antenna, the receiver circuitry provided at least partially in the housing;
   wireless sensor interface circuitry provided in the housing and electrically coupled to the receiver circuitry;
   processing circuitry electrically coupled to the wireless sensor interface circuitry and configured to:
      detect, in a wireless transmitting and receiving range of the self-contained apparatus, one or more machines at a worksite, including a first machine having a plurality of sensors; and
      identify the one or more machines detected at the worksite, including the first machine; and
   a touchscreen display physically coupled to the housing and electrically coupled to the processing circuitry, the touchscreen display being configured to display a graphical user interface generated using the processing circuitry;
   wherein the processing circuitry is further configured to:
      control the graphical user interface to display a first user input to select the first machine from a list of the one or more identified machines;
      receive a first operator input on the displayed first user input selecting the first machine from the list of the one or more identified machines;
      control the graphical user interface to display a graphic of the first machine responsive to receiving the first operator input on the displayed first user input;
      control the graphical user interface to display a second user input to identify one or more operating characteristics of the first machine to monitor;
      receive a second operator input on the displayed second user input identifying the one or more operating characteristics of the first machine to monitor;
      control the graphical user interface to display graphics corresponding to predetermined candidate sensor selection locations on the displayed graphic of the first machine associated with the identified one or more operating characteristics of the first machine to monitor responsive to receiving the second operator input on the displayed second user input, wherein none of said displayed graphics corresponding to the predetermined candidate sensor selection locations were immediately previously displayed prior to being displayed in response to receiving the second operator input on the displayed second user input;

control the graphical user interface to display a third user input including a plurality of identifiers shown on the graphical user interface that correspond in number to a number of the displayed graphics corresponding to the predetermined candidate sensor selection locations to individually select one or more sensors of the plurality of sensors of the first machine to wirelessly monitor, wherein each of the plurality of identifiers individually correspond to a respective one of the displayed graphics corresponding to the predetermined candidate sensor locations;

receive a third operator input dragging and dropping at least one of the plurality of identifiers to the respective one of the displayed graphics corresponding to the predetermined candidate sensor selection locations;

identify an operator-selected set of sensors of the plurality of sensors of the first machine responsive to the third operator input, the operator-selected set of sensors including at least a first sensor of the plurality of sensors of the first machine corresponding to the at least one of the plurality of identifiers dragged and dropped to the respective one of the displayed graphics corresponding to the predetermined candidate sensor selection locations and being less than a total number of sensors of the plurality of sensors of the first machine;

initiate the receiver circuitry to wirelessly receive sensor signals from only the operator-selected set of sensors of the plurality of sensors of the first machine responsive to the third operator input;

control the wireless sensor interface circuitry to receive and aggregate sensor data from the receiver circuitry corresponding to the sensor signals from the operator-selected sensors;

analyze the aggregated sensor data from the wireless sensor interface circuitry; and control the graphical user interface to display real-time information, based on the analyzed sensor data, corresponding to the identified one or more operating characteristics of the first machine and the operator-selected set of sensors.

2. The self-contained apparatus of claim 1, wherein the first user input includes a drop-down menu of the list of the one or more identified machines.

3. The self-contained apparatus of claim 1, wherein each machine of the list of the one or more identified machines is a different type of machine.

4. The self-contained apparatus of claim 1, wherein the operator-selected set of sensors are a same type of sensor.

5. The self-contained apparatus of claim 1, further comprising memory electrically connected to the processing circuitry, the memory storing sensor selection location templates that identify all sensor selection locations for each machine of the list of one or more identified machines, the predetermined candidate sensor selection locations being based on one of the sensor selection location templates associated with the first machine.

6. A method of comprising:

detecting, by processing circuitry electrically coupled to wireless sensor interface circuitry provided in a housing of a self-contained apparatus, in a wireless transmitting and receiving range of the self-contained apparatus, one or more machines at a worksite, including a first machine having a plurality of sensors;

identifying, by the processing circuitry, the one or more machines detected at the worksite, including the first machine;

controlling, by the processing circuitry, display of, on a touchscreen display physically coupled to the housing and electrically coupled to the processing circuitry, a graphical user interface generated using the processing circuitry;

controlling, by the processing circuitry, the graphical user interface to display a first user input to select the first machine from a list of the one or more identified machines;

receiving, by the processing circuitry, a first operator input on the displayed first user input selecting the first machine from the list of the one or more identified machines;

controlling, by the processing circuitry, the graphical user interface to display a graphic of the first machine responsive to the first operator input on the displayed first user input;

controlling, by the processing circuitry, the graphical user interface to display a second user input to identify one or more operating characteristics of the first machine to monitor;

receiving, by the processing circuitry, a second operator input on the displayed second user input identifying the one or more operating characteristics of the first machine to monitor;

controlling, by the processing circuitry, the graphical user interface to display graphics corresponding to predetermined candidate sensor selection locations on the displayed graphic of the first machine associated with the identified one or more operating characteristics of the first machine to monitor responsive to receiving the second operator input on the displayed second user input, wherein none of said displayed graphics corresponding to the predetermined candidate sensor selection locations were immediately previously displayed prior to being displayed in response to receiving the second operator input on the displayed second user input;

controlling, by the processing circuitry, the graphical user interface to display a third user input including a plurality of identifiers shown on the graphical user interface that correspond in number to a number of the displayed graphics corresponding to the predetermined candidate sensor selection locations to individually select one or more sensors of the plurality of sensors of the first machine to wirelessly monitor, wherein each of the plurality of identifiers individually correspond to a respective one of the displayed graphics corresponding to the predetermined candidate sensor locations;

receiving, by the processing circuitry, a third operator input dragging and dropping at least one of the plurality of identifiers to the respective one of the displayed graphics corresponding to the predetermined candidate sensor selection locations;

identifying, by the processing circuitry, an operator-selected set of sensors of the plurality of sensors of the first machine responsive to the third operator input, the operator-selected set of sensors including at least a first sensor of the plurality of sensors of the first machine corresponding to the at least one of the plurality of identifiers dragged and dropped to the respective one of the displayed graphics corresponding to the predetermined candidate sensor selection locations and being less than a total number of sensors of the plurality of sensors of the first machine;

initiating, by the processing circuitry, receiver circuitry, including an antenna, provided at least partially in the housing and electrically coupled to the wireless sensor interface circuitry, to wirelessly receive sensor signals from only the operator-selected set of sensors of the plurality of sensors of the first machine responsive to the third operator input;

controlling, by the processing circuitry, the wireless sensor interface circuitry to receive and aggregate sensor data from the receiver circuitry corresponding to the sensor signals from the operator-selected sensors;

analyzing, by the processing circuitry, the aggregated sensor data from the wireless sensor interface circuitry; and controlling, by the processing circuitry, the graphical user interface to display real-time information, based on the analyzed sensor data, corresponding to the identified one or more operating characteristics of the first machine and the operator-selected set of sensors.

7. The method of claim 6, wherein the operator-selected set of sensors are a same type of sensor.

8. The method of claim 6, wherein the predetermined candidate sensor selection locations are based on one of a plurality of sensor selection location templates associated with the first machine stored in memory.

* * * * *